June 21, 1938. J. M. DAYTON 2,121,396
DISPENSING APPARATUS WITH INDICATOR AND AUTOMATIC CONTROLS
Filed May 16, 1935
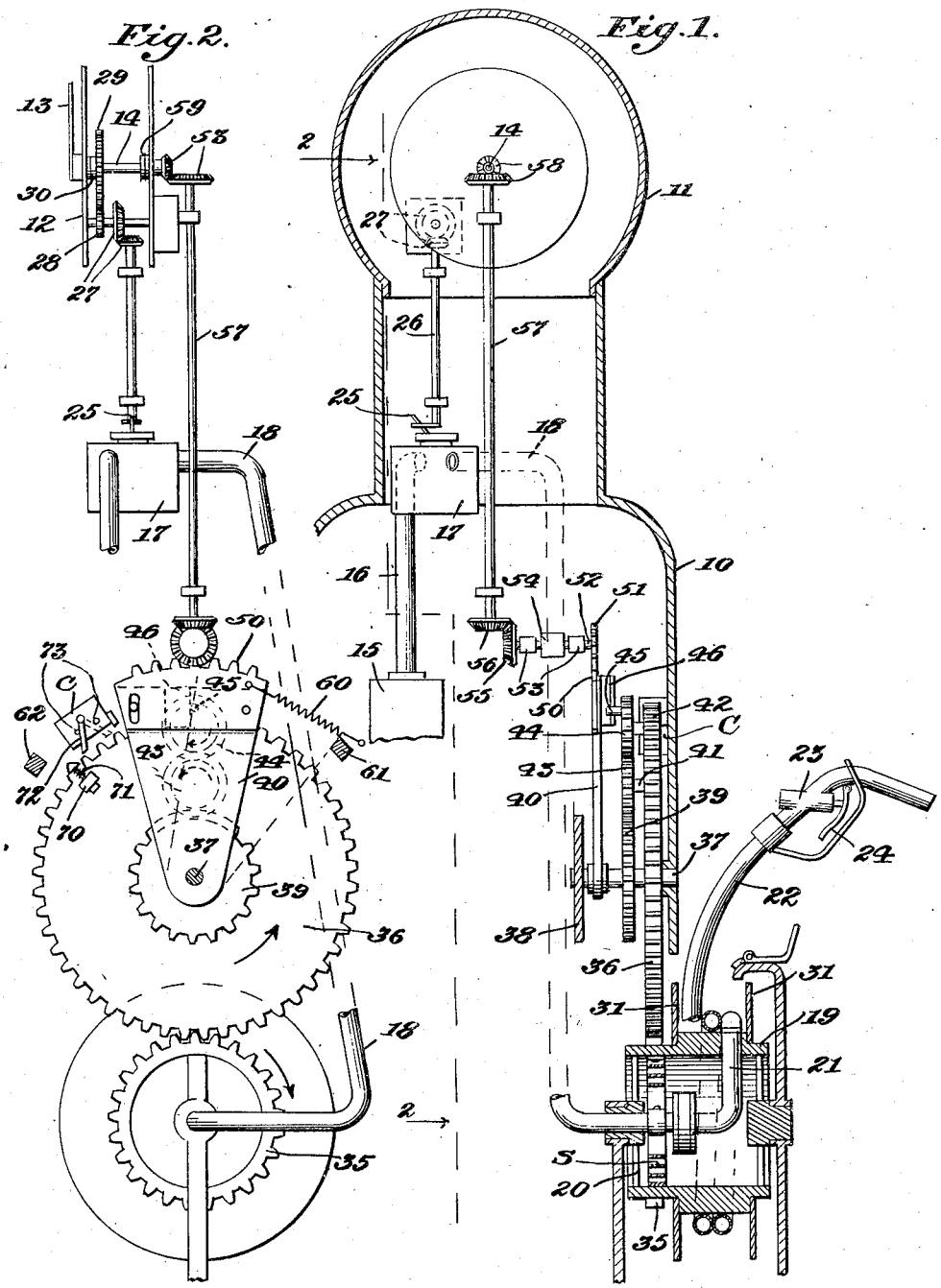
Inventor:
James M. Dayton,
by [signature]
Att'ys.

Patented June 21, 1938

2,121,396

UNITED STATES PATENT OFFICE 2,121,396

DISPENSING APPARATUS WITH INDICATOR AND AUTOMATIC CONTROLS

James M. Dayton, Torrington, Conn.

Application May 16, 1935, Serial No. 21,866

17 Claims. (Cl. 221—95)

This invention relates to improvements in dispensing apparatus, and is more particularly concerned with the employment of movement of the delivery member for controlling the indicator and the dispensing operation.

One of the features of the present invention is the provision of a dispensing apparatus including means for indicating the quantity dispensed, and a delivery member through which said quantity is discharged, together with devices by which movement of the delivery member into discharge position is employed for resetting the indicator as an initial phase of a dispensing operation.

Another feature of the present invention is the provision of a dispensing apparatus having means for indicating the quantity dispensed, and power-operated devices for effecting the dispensing operation, together with a delivery member through which the quantity is discharged and which during its movement into position for the dispensing operation effects a control of the power actuated system for the dispensing operation.

A further object of the invention is the provision of a dispensing apparatus for liquids in conjunction with means for measuring and indicating the quantity dispensed, and a delivery conduit which is moved in preparing for the dispensing operation, the movement of this hose being utilized for effecting a resetting of the indicator and the preparation of the apparatus for a power dispensing operation, during the preliminary portion of such movement of the delivery member.

With these and other features as objects in view, an illustrative form of practicing the invention is set out on the accompanying drawing, in which:

Figure 1 is an upright sectional view of portions of the dispensing apparatus and including a structure according to this invention.

Figure 2 is a diagrammatic view showing the parts and taken substantially on line 2—2 of Fig. 1.

In this drawing, the dispensing apparatus is illustrated as a gasoline pumping and discharge device of the type used at gasoline filling stations, and includes an outer casing 10 having an upper structure 11 in which is mounted a dial 12 opposite which is moved an indicating hand 13 which is fixed to a shaft 14.

A motor-driven pump assembly 15 draws the gasoline from the usual buried supply tank (not shown) and delivers it under pressure through the conduit 16 into a meter 17 from which it is discharged by a conduit 18. According to the illustrated form of the present invention, this conduit 18 extends axially through a hose reel 19 and is provided with a liquid-tight rotatable joint 20 which connects it to the extension 21 leading to the delivery hose 22 which terminates in a nozzle valve 23 which is illustrated as of ordinary construction, this valve being opened by movement of the trigger handle 24 in the usual way.

As the liquid flows through the meter 17, it is measured and the pin 25 of the meter moves about a vertical axis and thus turns the metering shaft 26 which is connected by the bevel gears 27 with a driving gear 28. The driving gear 28 meshes with a gear 29 which is connected by a friction clutch 30 with the shaft 14, so that the indicating hand 13 is moved over the scale 12 to show the quantity in volume delivered.

The hose reel 19 includes the faces 31 which contain the several turns of hose. A normal delivery hose for a gasoline dispensing station is around 12 feet long, so that two turns around a reel of 2 feet diameter is sufficient to receive the hose.

The reel is provided with gear teeth 35 which are in mesh with the teeth of a large gear 36. As the hose is fully withdrawn by a movement of slightly less than two complete revolutions of the reel, the gear 36 has substantially twice the pitch diameter as the teeth 35 on the reel 19, so that the maximum movement of gear 36 is a single revolution. The gear 36 is mounted on a fixed axis 37 supported by the casing 10 and by an internal bracket 38. Fixed to this shaft 37 is a stationary gear 39. A sweep arm 40 is loose on the shaft 37. The gear 36 supports the pivots 41 and 42 of an idler gear 43 and a pin gear 44 which carries eccentrically a pin 45 on the gear face which is turned toward the sweep arm 40.

The sweep arm 40 has a spring plate 46 projecting from the face of the arm which is directed toward the gear 44. This plate has a limited radial extension, so that the pin 45 may pass beneath the lower edge of this plate during the course of the movement of the parts.

At the peripheral edge of the sweep arm 40 is pivoted a toothed rack 50 engaged with a small gear 51 on a shaft 52 which is supported by the brackets 53 of the casing 10. An overrunning clutch 54 is included in the shaft 52, so that the gear 51 causes a rotation of the bevel gear 55 during its movement in one direction but turns freely without moving the same in the other direction. The gear 55 meshes with a bevel gear 56 on a resetting shaft 57 which extends upwardly and at its upper end operates to drive the bevel gears 58 and thus to drive the shaft 14 through the friction clutch 59 (Fig. 2).

The sweep arm 40 is normally held in its right-hand position or urged toward the right-hand position (Fig. 2) by a return spring 60. The movement of the sweep arm 40 in a clockwise direction toward the right-hand position is limited by a fixed stop 61 on the casing 10. Similarly, it is preferred to employ a stop piece 62 for limiting the movement in a counterclockwise direction toward the left.

An upstanding lug 70 on the large gear 36 supports a spring-pressed plunger 71. A switch C is mounted on the fixed frame and has a movable switch arm 72 which is limited in its movement by the stops 73.

The operation of this structure is as follows:

When a dispensing operation is completed, the quantity dispensed is revealed at the indicator 12—13, the motor-pump assembly is at a standstill, the switch arm 72 is in the dotted line position (Fig. 2), the hose is fully wound on the reel 19 so that the hose nozzle is in fully retracted position, the large gear 36 is in the extreme position of clockwise movement, and the sweep arm 40 is likewise in its right-hand position (dotted lines in Fig. 2) in engagement with the stop 61 and free of gear 51. The pin 45 is presented against the right-hand edge of the plate 46.

To accomplish the next dispensing operation, the operator seizes the nozzle 23 and withdraws it. This causes a partial rotation of the reel 19 so that the gear teeth 35 move in a clockwise direction and cause a counterclockwise movement of the large gear 36. Shortly after the beginning of this movement of the gear 36, the spring plunger 71 encounters the switch arm 72 and moves it to the full line position (Fig. 2) so that the motor-pump assembly is energized and starts. The spring-pressed plunger 71 then escapes from the switch arm with compression of its spring.

Simultaneously with this initial starting of the motor-pump assembly through the switch C, the gear 43 has been carried in rotation with the gear 36 and rolls on the fixed gear 39 so that it is rotated in a counterclockwise direction and effects a clockwise rotation of the gear 44 which is likewise carried on the gear 36. The dimension of the parts is such, however, that the apparent recession of the pin 45 from the plate 46 relative to the periphery of the gear 36 is less than the angular forward movement of the gear 36, so that the pin 45 presses against the plate 46 and therewith carries the sweep arm 40 in a counterclockwise direction against the pull of its spring 60. The gear 51 is rotated but the overrunning clutch 54 slips and no movement of the resetting shaft 57 occurs.

Ultimately, the rotation of the gear 44 causes the pin 45 to pass beyond the lower edge of the plate 46 so that this plate is no longer being moved in a counterclockwise direction and thus the plate 46 and the sweep arm 40 are released. The spring 60 immediately pulls the sweep arm 40 in a clockwise direction, causing a rotation of the gear 51 in the opposite direction so that the shaft 52 operates through the overrunning clutch 54 to cause a rotation of the resetting shaft 57, and this in turn operates through the friction clutch 59 to cause the rotation of the shaft 14 and a resetting of the indicator hand 13 back to initial position. The sweep arm 40 is ultimately brought to a standstill by the stop 61.

It is preferred that this starting of the motor and resetting of the indicator shall occur before the nozzle 23 has moved any substantial distance so that that it cannot be brought near an automobile tank or other usual container before a full resetting has occurred.

During the remaining portion of the withdrawal movement of the hose 22, the gear teeth 35 turn the gear 36 but no further action occurs.

Upon opening the nozzle 24 at any time during the energization of the motor pump assembly 15, gasoline may be discharged from the nozzle and is flow-controlled and stopped by the nozzle valve. The gear 51 is free of the rack 50, and the indicating system can turn freely.

At the completion of the dispensing operation by the final closure of the nozzle valve, the indicator hand 13 shows the quantity which has been delivered during this dispensing operation. The attendant can release or return the hose 22 so that the spring S operates to restore the reel to its former position. During the major portion of this return movement, the gear teeth 35 merely turn the large gear 36 back to its initial position. Close to the end of this movement the returning gears 43 and 44 cause the pin 45 to engage the plate 46 and to press it resiliently toward the sweep arm 40 so that the pin 45 is finally located at the right of this plate ready for the next resetting operation. The spring-pressed plunger 71 again engages the switch arm 72 and moves the latter from the full line to the dotted line position in Fig. 2, thus terminating the energization of the motor-pump assembly. The parts have thus been restored to initial position.

By this employment of the delivery member (the hose in the illustrated form) as a means for accomplishing the starting of the power devices (the motor-pump assembly in the illustrated form) and for resetting the indicator, as initial steps in the dispensing operation, the control of the apparatus becomes substantially automatic and yet the operation is safe-guarded against the possibility of an attendant defrauding a customer by failing to completely reset the indicator from its prior position. A particular phase of the illustrated form is that the speed of movement of withdrawing the nozzle does not determine the rapidity of resetting, as the resetting is accomplished under the action of the spring 60 during the return of the sweep arm 40.

It is preferred to have the teeth of rack 50 movable with respect to the sweep arm 40 as a means of insuring proper engagement with the gear 51 during the initial stage of the counterclockwise movement of the sweep arm 40.

It is obvious that many changes may be made in the practice of the invention without departing from the scope of the appended claims.

I claim:

1. A dispensing apparatus comprising a movable delivery member, dispensing means for supplying the dispensed material through the delivery member and for measuring the quantity dispensed, an indicator driven from the dispensing means, and means for resetting the indicator; said resetting means including a power storage device movable between an initial and an energy-storage position, and means actuated by the movement of the delivery member toward delivery position for storing energy in said device and for thereafter releasing the device for effecting a resetting during return of the device into its initial position, whereby the indicator remains at the position attained during a prior dispensing operation until a preliminary movement of the delivery member is effected for a new dispensing operation.

2. A dispensing apparatus comprising a delivery member movable to and from an idle position and dispensing positions, dispensing means for supplying the dispensed material through the delivery member and for measuring the quantity dispensed, an indicator driven from the dispensing means, and means for resetting the indicator; said resetting means including a power-storage device movable between an initial and an energy-storage position and effective during movement from energy-storage to initial position for effecting the resetting, and means connected to and actuated by the movement of the delivery member toward delivery position for storing energy in said power-storage device, and including an element connected with the dispensing means for bringing the latter into dispensing condition during the initial part of the said movement of the delivery member, and also including an element for disconnecting the power-storage device from the connected means after said dispensing means has been brought into condition for dispensing so that resetting occurs while the apparatus is in condition for dispensing, said connected means including parts for bringing the dispensing means out of dispensing condition and for reestablishing connection of said power-storage device with said connected means when the delivery member has been returned to said idle position whereby the indicator remains at the position attained during a prior dispensing operation until a preliminary movement of the delivery member away from idle position is effected for a new dispensing operation.

3. A dispensing apparatus comprising a delivery member movable between a dispensing and a non-dispensing position, means for supplying the dispensed material through the delivery member and for measuring the quantity dispensed, an indicator driven from the measuring means, a power storage device, energizing means connected to the delivery member and actuated by the movement of the delivery member from non-dispensing toward dispensing position for moving the device from an initial to an energized position, said energizing means including means for releasing the same from the power storage device for preventing further energization of the device after a predetermined movement of the delivery member and for effecting a return movement of the power storage device by its stored power from its energized position to its initial position, and means actuated by the return movement of the power storage device for resetting the indicator, said releasing means being constructed and arranged to be effective for re-engaging said power storage device when the delivery member is returned to said non-dispensing position.

4. A dispensing apparatus for liquids comprising a delivery conduit having a discharge nozzle, said conduit permitting movement of the nozzle between dispensing and nondispensing positions, means for supplying the liquid through said conduit, a meter for the liquid dispensed and an indicator driven thereby, a power storage device energized through the initial movement of the nozzle toward dispensing position and means for releasing said device upon completion of a predetermined nozzle movement, and means actuated by the power storage device when released for resetting the indicator.

5. A dispensing apparatus for liquids comprising a delivery hose and a nozzle, an automatic reel for said hose including a rewinding spring, a member rotated by the reel during the movement of the nozzle from non-dispensing toward dispensing position, a power device connected to said member to be moved into an energy-storage position thereby during the movement of said nozzle toward dispensing position, means controlled by the position of said reel for releasing the power device upon the completion of a predetermined movement of the rotated member, and means for resetting the indicator and actuated by energy stored in said power device when the latter is released, said reel, member, device and means being constructed and arranged to be returned to initial relative position by the return of the reel to initial position.

6. A dispensing apparatus comprising a movable delivery member, power means for supplying the dispensed material through the delivery member, control means for the power means, means for measuring the quantity of material dispensed, an indicator driven by said measuring means, and devices actuated by the movement of the delivery member toward dispensing position, said devices including an element connected with the control means for actuating the same for energizing the power means during the initial part of such movement of the delivery member, and also including an element connected with the indicator for effecting a resetting of the indicator after the power means has been energized.

7. A dispensing apparatus comprising a movable delivery member, power means for supplying the dispensed material through the delivery member, control means for the power means, means for measuring the quantity of material dispensed, an indicator driven by said measuring means, a power storage device energized by the movement of the delivery member, and released after a predetermined energizing movement thereby, devices energized by the movement of the delivery member for actuating the control means prior to the release of the power storage device, and means actuated by the return of the power storage device for resetting the indicator.

8. A dispensing apparatus comprising a movable delivery member, means for supplying the dispensed material through the delivery member and for measuring the quantity dispensed and including power means for moving the material, control means for the power means, an indicator driven by said measuring means, a power storage device energized by the initial movement of the delivery member toward dispensing position, devices energized during the initial movement of the delivery member for actuating said control means and thereby energizing the power means and operating at the return of the discharge member into non-dispensing position for returning said control means and deenergizing the power means, means for releasing said power storage device upon completion of a predetermined initial movement of the delivery member, and devices actuated by said power device when released for resetting the indicator.

9. A dispensing apparatus for liquids comprising a delivery hose having a discharge nozzle, power means for supplying the liquid through said hose, a meter for the liquid dispensed and an indicator driven thereby, a reel for receiving the hose and thereby presenting the nozzle in a non-dispensing position, said reel permitting the unwinding of the hose to bring the nozzle into dispensing position, and devices operated by the unwinding movement of the reel for effecting a resetting of the indicator and returned to position for freeing the indicator for a further indication prior to the completion of such unwinding movement.

10. A dispensing apparatus as in claim 9, in which the said devices comprise gear teeth on the reel and a large gear in mesh with said gear teeth, a sweep arm, devices actuated by the movement of said sweep arm in one direction for effecting a resetting of the indicator, and means for producing a movement of the sweep arm during initial movement of the nozzle toward dispensing position and for returning the sweep arm during a further movement of the nozzle.

11. A dispensing apparatus as in claim 9, in which said latter devices include gear teeth on the reel, a large gear in mesh with said gear teeth and driven thereby, a sweep arm and means for returning the same to initial position, a fixed gear, gear means in mesh with said fixed gear and pivoted on said large gear, an eccentric pin on said gear means, a device on the sweep arm engaged by said pin so that the large gear causes a rocking movement of the sweep arm during the initial movement of the nozzle toward dispensing position and thereafter a release of the sweep arm so that the latter is returned to initial position, and resetting means for the indicator actuated by the return movement of the sweep arm.

12. A dispensing apparatus as in claim 9, including power control means actuated by said latter devices during the initial movement of the nozzle toward dispensing position and actuated in a reverse direction during the final return movement of the nozzle into non-dispensing position.

13. A dispensing apparatus comprising a delivery hose having a discharge nozzle, a reel upon which said hose is wound for presenting the nozzle in a non-dispensing position, power means for supplying the liquid through the hose, a meter for the liquid dispensed and an indicator driven thereby, means actuated by the reel during the unwinding movement of the hose for producing an energization of the power means immediately upon the initial movement of the nozzle toward dispensing position, a power storage device energized during the initial movement of said power control devices, said power control devices including means for releasing the engagement between the same and the power storage device, and resetting devices for the indicator actuated by the power storage device in returning to initial position.

14. A dispensing apparatus comprising a movable delivery member, means for supplying the dispensed material through the delivery member and for measuring the quantity dispensed and including power means for moving the material, control means for the power means, an indicator driven by said measuring means, a power storage device moved from an initial into a moved position and thereby energized by the initial movement of the delivery member toward dispensing position, means for releasing the device for return from moved position toward initial position by the stored power after a predetermined storage of energy in said device from said delivery member, means controlled by and during the initial movement of the delivery member for actuating said control means and thereby energizing the power means and operating at the return of the discharge member into non-dispensing position for returning said control means and deenergizing the power means, and devices actuated by said power device when released for resetting the indicator.

15. A dispensing apparatus comprising a delivery hose with a valved nozzle at its end, a reel for receiving the hose during intervals between dispensing operation, a motor-pump for supplying liquid through the hose, a measuring means for determining the quantity of liquid dispensed and an indicator driven thereby, a rockable member driven by the reel in proportion to the unwinding and rewinding movement of the hose, a switch for controlling the energization of the motor-pump, and means carried by the rockable member for moving the switch to energizing position upon the initial unwinding movement of the reel and before the nozzle attains a dispensing position and for moving the switch to de-energizing position immediately prior to completion of the rewinding movement of the reel.

16. A dispensing apparatus comprising a delivery hose with a valved nozzle at its end, a reel for receiving the hose during intervals between dispensing operations, power means for rotating the reel for rewinding the hose thereon when the hose is released, a motor-pump for supplying liquid through the hose, a measuring means for determining the quantity of liquid dispensed and an indicator driven thereby, power means actuated by the reel movement and effective during unwinding of the hose for energizing the motor before the nozzle attains a dispensing position and effective during rewinding of the hose for de-energizing the motor, and means coordinated with the power means and likewise actuated under control of the reel for effecting a resetting of said indicator.

17. A dispensing apparatus comprising a delivery hose and nozzle, a reel for receiving the hose during intervals between dispensing operations, a motor-pump for supplying liquid through the hose, a measuring means for determining the quantity of liquid dispensed and an indicator driven thereby, power control means actuated by the reel movement and effective to energize the motor upon a predetermined initial unwinding movement of the hose before the nozzle attains a dispensing position, and means actuated by said reel for resetting the indicator.

JAMES M. DAYTON.